(12) United States Patent
Pan et al.

(10) Patent No.: US 8,170,045 B2
(45) Date of Patent: May 1, 2012

(54) CLASS-BASED BANDWIDTH PARTITIONING

(75) Inventors: Rong Pan, Sunnyvale, CA (US); Stanley Arthur Trimble, Livermore, CA (US); Flavio Giovanni Bonomi, Palo Alto, CA (US)

(73) Assignee: Cisco Technology, Inc., San Jose, CA (US)

(*) Notice: Subject to any disclaimer, the term of this patent is extended or adjusted under 35 U.S.C. 154(b) by 985 days.

(21) Appl. No.: 11/257,141

(22) Filed: Oct. 24, 2005

(65) Prior Publication Data

US 2007/0091802 A1    Apr. 26, 2007

(51) Int. Cl.
*H04L 12/54* (2006.01)
*G01R 31/08* (2006.01)

(52) U.S. Cl. .................................. 370/429; 370/229
(58) Field of Classification Search .......... 370/229–240, 370/359, 395.41, 395.42, 412–419, 429
See application file for complete search history.

(56) References Cited

U.S. PATENT DOCUMENTS

| | | | |
|---|---|---|---|
| 6,463,068 | B1 | 10/2002 | Lin et al. |
| 2003/0189934 | A1 | 10/2003 | Jeffries et al. |
| 2003/0189943 | A1 | 10/2003 | Gorti et al. |
| 2005/0083845 | A1* | 4/2005 | Compton et al. ............ 370/235 |
| 2005/0094567 | A1* | 5/2005 | Kannan et al. ............... 370/241 |
| 2007/0070907 | A1* | 3/2007 | Kumar et al. ................ 370/235 |
| 2007/0248005 | A1* | 10/2007 | Pan et al. ..................... 370/230 |

OTHER PUBLICATIONS

Pan et al., "Approximate Fairness through Differential Dropping," ACM SIGCOMM Computer Communication Review, vol. 33, Issue 2, (Apr. 2003), pp. 23-39.
Le et al, "Differential Congestion Notification: Taming the Elephants,"Proceedings of the 12th IEEE International Conference on Network Protocols (ICNP'04), IEEE Computer Society, (2004), pp. 118-128.
Branden et al., "Recommendations on Queue Management and Congestion Avoidance in the Internet," RFC 2309, IETF, Apr. 1998.

* cited by examiner

*Primary Examiner* — Kwang B Yao
*Assistant Examiner* — Tung Q Tran
(74) *Attorney, Agent, or Firm* — The Law Office of Kirk D. Williams (57) ABSTRACT

Class-based bandwidth partitioning of a sequence of packets of varying packet classes is performed, such as, but not limited to determining whether or not to admit a packet to a queue based on a probability corresponding to a class of packets associated with the packet, with this probability being based on measured arrival traffic and a fair share based on the length of the queue. Data path processing is performed on each packet to determine whether to admit or drop the packet, and to record the measured received traffic. Control path processing is periodically performed to update these probabilities based on determined arrival rates and fair shares for each class of packets. In this manner, a relatively small amount of processing and resources are required to partition bandwidth for a scalable number of classes of packets.

34 Claims, 6 Drawing Sheets

DATA PATH PROCESSING

FIGURE 3A

CONTROL PATH
PERIODIC PROCESSING
/ 320

```
//update the queue variables
If (M_i < History_threshold || Q_len < Queue_threshold) {         ← 321
            active = off
            M_fair = M_fair_max/nclass      ← 322
} else {
                                            ← 323
            active = on;
            M_fair = M_fair – a1*(Q_len– Q_ref)>>n + a2*( Q_len _old– Q_ref ) >> n
            if (M_fair > M_fair_max) M_fair = M_fair_max
            if (M_fair < 0) M_fair = 0
}
Q_len _old = Q_len    ← 324

//update each class's variables        ← 330
for (i = 0; i << number_of_class; i++) {
    If (Wakeup == 0)       ← 331
            //Time averaging of Arrival rate of a class  ← 332
            M_i = M_i – M_i >> b + M_new(i)
            M_new(i) = 0;
                                                   ← 333
            Tmp_mfair = M_fair *Weight(i)         //Weighted fairness
            If (Mi < Tmp_mfair) {               ← 334
                     DL(i) = 255;      //no drop
            } Else {
                     //binary search of minimum Di such that mi(1-Di) < mfair,
                     //D_i = 1- DL(i)/255
                     Tmp_var1 = Mi/2;
                     Tmp_var2 = Mi/4;
                     DL(i)  = 0;
                     For (j = 7; j >= 0; j++) {
                                If (Tmp1 <= Tmp_mfair) {
                                          DL(i)  = DL(i)  | (1<< j)
                                          Tmp_var1 = Tmp_var1+Tmp_var2
                                } else
                                          Tmp_var1 = Tmp_var1-Tmp_var2
                                }
                                Tmp_var2 = Tmp_var2/2
                     }
            }                                      ← 335
            //Wake_up_reload decides whether to wake up every 10ms or 20ms...
            Wakeup == Wakeup_reload
    } else {
            Wakeup --;     ← 336
}
```

CONTROL PATH PROCESSING
FIGURE 3B

CLASS-BASED BANDWIDTH PARTITIONING

TECHNICAL FIELD

One embodiment of the invention relates to communications and computer systems, especially routers, packet switching systems, and other devices; and more particularly, one embodiment relates to class-based bandwidth partitioning, such as, but not limited to determining whether or not to admit a packet to a queue based on a probability associated with measured arrival rates and a fair share based on the length of the queue.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP). Note, nothing described or referenced in this document is admitted as prior art to this application unless explicitly so stated.

Two general approaches to address the problem of fair bandwidth partitioning used in the industry are Distributed Round Robin (DRR) and Weighted Random Early Detection (WRED). WRED is described in Lin et al., U.S. Pat. No. 6,463,068, issued Oct. 8, 2002, which is hereby incorporated by reference in its entirety.

DRR stores traffic from different classes into separate queues and serves these queues in a round-robin fashion. DRR can provide quantum-level fairness; however, it is rather complex to implement, and such implementations are not easily scalable nor expandable to be able to service additional resources (e.g., the expanding number of queues). WRED, on the other hand, is much simpler to implement, as it stores packets into one single FIFO buffer. Unfortunately, it offers only limited fairness and it is hard to set WRED's parameters, which are not self-adjusting to address changing traffic conditions. Even though many implementations involve adopting WRED on individual queues of DRR, the task of bandwidth partitioning is still mainly done by DRR because of the unsatisfactory performance of WRED.

Another recently developed approach is Approximate Fair Dropping (AFD), which is described in Pan et al., "Approximate Fairness through Differential Dropping," ACM SIGCOMM Computer Communication Review, Vol. 33, Issue 2 (April 2003), pp. 23-39, and is hereby incorporated by reference in its entirety. AFD provides fair bandwidth allocation to multiple flows of packets entering a single queue, where a flow is defined as a stream of packets with the same source-destination addresses, although other definitions of flows could be used. AFD bases its packet dropping decisions on a recent history of packet arrivals for these packet flows, and can approximate maximum-minimum fairness with a limited amount of additional states.

Briefly, the high-level design of AFD has three key elements of arrival rate estimation, drop probability calculation, and fair share calculation. In regards to arrival rate estimation, AFD keeps track of all packets that have recently arrived at the entrance to the physical queue over a certain time period. That is, for each packet flow i, let $m_i$ be the amount of traffic (i.e., number of all packets arrived, not just those admitted) for the flow i. In determining whether or not a particular packet is dropped or admitted to the queue, AFD uses the following equation to admit or drop arriving packets for flow i fairly, find $d_i$ such that $m_i*(1-d_i)=m_{fair}$. In other words, $d_i=(1-m_i/m_{fair})$; and if $d_i$ is positive, drop the incoming packet with probability $d_i$; otherwise, admit packet to the queue. The fair share is estimated dynamically as follows by looking at the size of the queue: $m_{fair}=m_{fair}-a_1*(Q_{len}-Q_{ref})+a_2*(Q_{len\_old}-Q_{ref})$, where $Q_{len}$ is the real queue length (currently measured); $Q_{len\_old}$ is the real queue length (previously measured); $Q_{ref}$ is the reference queue length (set by the operator); $a_1$ and $a_2$ are the averaging parameters (design parameters). Note, $Q_{len}$ and $Q_{len\_old}$ together give both the first and second moment information about the queue size; that is, not only how the current occupancy of the queue, but also whether it is going towards the target occupancy or moving away from the target occupancy, which helps us control $m_{fair}$ more accurately. AFD provides a nice theoretical basis for performing bandwidth partitioning; but does not provide a comprehensive and practically implementable solution.

SUMMARY

Disclosed are, inter alia, methods, apparatus, data structures, computer-readable media, mechanisms, and means for class-based bandwidth partitioning, such as, but not limited to determining whether or not to admit a packet to a queue based on a probability associated with measured arrival rates and a fair share based on the length of the queue.

One embodiment processes each particular packet of a sequence of packets in order (a) to determine whether to admit this particular packet to a queue or drop this particular packet based on a particular probability determined from a corresponding particular arrival rate and a corresponding fair share identified based on a length of the queue, (b) to update a measurement of arrived traffic corresponding to a particular class of packets associated with this particular packet, and (c) to admit or drop this particular packet in response to the result of the determination of whether to admit or drop this particular packet. Note, this particular packet and the particular arrival rate each correspond to the particular class, each of multiple classes of packets is associated with an arrival rate of multiple arrival rates and a fair share of multiple fair shares, each of the packets corresponds to a class of packets, and each of the arrival rates has a corresponding probability. One embodiment periodically, after each periodic predetermined duration (e.g., after a set time or after processing of a predetermined number of packets greater than one), updates the arrival rates for each of the classes of packets based on the measurements of arrived traffic, and updates the fair shares based on a current length of the queue. Typically, this periodic processing updates the probabilities based on the fair shares and the arrival rates so they do not need to be calculated when processing a packet; although one embodiment calculates the probability when it processes the particular packet.

In one embodiment, this periodic processing includes identifying a state being active or inactive; and wherein said processing each particular packet includes admitting the particular packet regardless of the particular probability in response to state being inactive. In one embodiment, identifying the state as being active or inactive includes identifying that a length of the queue is less than or equal to a predetermined queue length threshold value. In one embodiment, identifying the state being active or inactive includes steps for identifying that a cumulative arrival rate of the plurality of packets is less than or equal to a predetermined cumulative arrival rate threshold value.

In one embodiment, processing each particular packet includes identifying whether or not the particular arrival rate equals or exceeds a burst threshold, and in response to identifying that the particular arrival rate equals or exceeds the burst threshold, the particular packet is dropped. In one embodiment, the periodic processing includes estimating incoming rates of each of the classes of packets; and wherein the processing of each particular packet includes dropping or admitting the particular packet based on the estimated incoming rate of the particular class of packets.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Disclosed are, inter alia, methods, apparatus, data structures, computer-readable media, mechanisms, and means for class-based bandwidth partitioning, such as, but not limited to determining whether or not to admit a packet to a queue based on a probability associated with measured arrival rates and a fair share based on the length of the queue.

Note, embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations. Note, computer-readable media and means for performing methods and processing block operations are disclosed and are in keeping with the extensible scope and spirit of the invention.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or direct or indirect identification of a packet or information associated therewith. For example, often times a router operates on one or more fields of a packet, especially the header, so the body of the packet is often stored in a separate memory while the packet header is manipulated, and based on the results of the processing of the packet (i.e., the packet header in this example), the entire packet is forwarded or dropped, etc. Additionally, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data. The term or deference to "dropping" a packet or a variant thereof (e.g., drop the packet, the packet is dropped, etc.) is used herein to identify the physical dropping of the packet, causing the packet to be dropped, and/or marking or distinguishing the packet for subsequent dropping or potentially different processing (e.g., a higher probability of being dropped by subsequent processing, Early Congestion Notification marking, etc) than that of an "admitted" packet.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value- the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications media or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, storage mechanism, and other storage mechanisms. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. The term "subtree" is used to indicate all or less than all of a tree. Moreover, the term "or" is used herein to identify a selection of one or more, including all, of the conjunctive items.

Disclosed are, inter alia, methods, apparatus, data structures, computer-readable media, mechanisms, and means for class-based bandwidth partitioning, such as, but not limited to determining whether or not to admit a packet to a queue based on a probability associated with measured arrival rates and a fair share based on the length of the queue.

One embodiment processes each particular packet of a sequence of packets in order (a) to determine whether to admit this particular packet to a queue or drop this particular packet based on a particular probability determined from a corresponding particular arrival rate and a corresponding fair share identified based on a length of the queue, (b) to update a measurement of arrived traffic corresponding to a particular class of packets associated with this particular packet, and (c) to admit or drop this particular packet in response to the result of the determination of whether to admit or drop this particular packet. Note, this particular packet and the particular arrival rate each correspond to the particular class, each of multiple classes of packets is associated with an arrival rate of multiple arrival rates and a fair share of multiple fair shares, each of the packets corresponds to a class of packets, and each of the arrival rates has a corresponding probability. One embodiment periodically, after each periodic predetermined duration (e.g., after a set time or after processing of a predetermined number of packets greater than one), updates the arrival rates for each of the classes of packets based on the measurements of arrived traffic, and updates the fair shares based on a current length of the queue. Typically, this periodic processing updates the probabilities based on the fair shares and the arrival rates so they do not need to be calculated when processing a packet; although one embodiment calculates the probability when it processes the particular packet.

In one embodiment, this periodic processing includes identifying a state being active or inactive; and wherein said processing each particular packet includes admitting the particular packet regardless of the particular probability in response to state being inactive. In one embodiment, identifying the state as being active or inactive includes identifying that a length of the queue is less than or equal to a predetermined queue length threshold value. In one embodiment, identifying the state being active or inactive includes steps for identifying that a cumulative arrival rate of the plurality of packets is less than or equal to a predetermined cumulative arrival rate threshold value.

In one embodiment, processing each particular packet includes identifying whether or not the particular arrival rate equals or exceeds a burst threshold, and in response to identifying that the particular arrival rate equals or exceeds the burst threshold, the particular packet is dropped. In one embodiment, the periodic processing includes estimating incoming rates of each of the classes of packets (e.g., by timing averaging the measured arrival rates); and wherein the processing of each particular packet includes dropping or admitting the particular packet based on the estimated incoming rate of the particular class of packets.

One embodiment for partitioning bandwidth includes: means for processing each particular packet of a plurality of packets in order to determine whether to admit said particular packet to a queue or drop said particular packet based on a particular probability of a plurality of probabilities corresponding to a particular class of a plurality of classes of packets, to update a measurement of arrived traffic corresponding to the particular class of packets, and to admit or drop said particular packet in response to said determination of whether to admit or drop said particular packet; wherein said particular packet corresponds to the particular class of packets, each of the plurality of packets corresponds to a class of the plurality of classes of packets, and each of the plurality of classes is associated with an arrival rate of a plurality of arrival rates and a fair share of a plurality of fair shares; and means for periodically updating, after a predetermined duration exceeding the processing time of multiple packets by said means for processing each particular packet, said arrival rates based on said measurements of arrived traffic, said fair shares based on the length of the queue, and said probabilities based on said arrival rates and said fair shares. In one embodiment, said means for processing each particular packet includes means for identifying whether or not a particular arrival rate of the plurality of arrival rates corresponding to the particular class of packets equals or exceeds a burst threshold, and for dropping said particular packet in response to said identifying said particular arrival rate equals or exceeds the burst threshold. In one embodiment, said means for processing of said particular packet includes means for comparing a particular arrival rate of the plurality of arrival rates corresponding to the particular class of packets and a burst rate threshold in order to identify whether or not said particular packet should be dropped based on the burst rate threshold, and in response to said identifying that said particular packet should be dropped based on the burst rate threshold, dropping the particular packet. In one embodiment, said means for periodically updating the plurality of arrival rates updates includes means for estimating incoming rates of each of said plurality of classes; and wherein said means for processing each particular packet includes means for dropping or admitting the particular packet based on said estimated incoming rate of the particular class.

In one embodiment, said means for periodically updating the plurality of arrival rates updates includes means for identifying an inactive state; and wherein said means for processing each particular packet includes means for admitting the particular packet regardless of the particular probability in response to the inactive state. In one embodiment, said means for identifying the inactive state includes means for identifying that a length of the queue is less than or equal to a predetermined queue length threshold value. In one embodiment, said means for identifying the inactive state includes means for identifying that a cumulative arrival rate of the plurality of packets is less than or equal to a predetermined cumulative arrival rate threshold value.

One embodiment for partitioning bandwidth includes: a data path processing mechanism configured to process each particular packet of a plurality of packets in order to determine whether to admit said particular packet to a queue or drop said particular packet based on a particular probability determined from a particular arrival rate of a plurality of arrival rates and a fair share of a plurality of fair shares identified based on a length of the queue, to update a measurement of arrived traffic corresponding to a particular class of a plurality of classes of packets, and to admit or drop said particular packet in response to said determination of whether to admit or drop said particular packet; wherein said particular packet and said particular arrival rate each correspond to the particular class; wherein each of the plurality of classes is associated with an arrival rate of the plurality of arrival rates and a fair share of the plurality of fair shares, each of the plurality of packets corresponds to a class of the plurality of classes of packets, and each of the plurality of arrival rates has a corresponding said probability; and a control path processing mechanism configured to periodically update, after a predetermined duration exceeding the processing time of multiple packets by the data path processing mechanism, the plurality of arrival rates for each of the plurality of classes based on said measurements of arrived traffic, and the plurality of fair shares based on a current length of the queue.

In one embodiment, the control path processing mechanism is configured to periodically update said plurality of probabilities based on the plurality of fair shares and the plurality of arrival rates. In one embodiment, the data path processing mechanism is configured to identify whether or not said particular arrival rate equals or exceeds a burst threshold, and in response to said identifying said particular arrival rate equals or exceeds the burst threshold, the data path processing mechanism causing the particular packet to be dropped. In one embodiment, the control path processing mechanism includes is configured to estimate incoming rates of each of said plurality of classes; and wherein the data path processing mechanism is configured to drop or admit the particular packet based on said estimated incoming rate of the particular class. In one embodiment, the control path processing mechanism is configured to identify an inactive or an active state; and wherein the data path processing mechanism is configured admit the particular packet regardless of the particular probability in response to the inactive state. In one embodiment, the control path processing mechanism identifies the inactive state in response to a length of the queue being less than or equal to a predetermined queue length threshold value. In one embodiment, the control path processing mechanism identifies the inactive state in response to a cumulative arrival rate of the plurality of packets being less than or equal to a predetermined cumulative arrival rate threshold value.

One embodiment for partitioning bandwidth processes each particular packet of a plurality of packets in order to determine whether to admit said particular packet to a queue or drop said particular packet based on a particular probability determined from a particular arrival rate of a plurality of arrival rates and a fair share of a plurality of fair shares identified based on a length of the queue, to update a measurement of arrived traffic corresponding to a particular class of a plurality of classes of packets, and to admit or drop said particular packet in response to said determination of whether to admit or drop said particular packet; wherein said particular packet and said particular arrival rate each correspond to the particular class; wherein each of the plurality of classes is associated with an arrival rate of the plurality of arrival rates and a fair share of the plurality of fair shares, each of the plurality of packets corresponds to a class of the plurality of classes of packets, and each of the plurality of arrival rates has a corresponding said probability; and periodic processes after a predetermined duration, with said periodic processing including updating the plurality of arrival rates for each of the plurality of classes based on said measurements of arrived traffic, and the plurality of fair shares based on a current length of the queue.

In one embodiment, said periodic processing updates said probabilities based on the plurality of fair shares and the plurality of arrival rates. In one embodiment, said periodic processing includes identifying a state being active or inactive; and wherein said processing each particular packet includes admitting the particular packet regardless of the particular probability in response to state being inactive. In one embodiment, said identifying the state being active or inactive includes identifying that a length of the queue is less than or equal to a predetermined queue length threshold value. In one embodiment, said identifying the state being active or inactive includes steps for identifying that a cumulative arrival rate of the plurality of packets is less than or equal to a predetermined cumulative arrival rate threshold value. In one embodiment, said processing each particular packet includes identifying whether or not said particular arrival rate equals or exceeds a burst threshold, and in response to said identifying said particular arrival rate equals or exceeds the burst threshold, causing the particular packet to be dropped. In one embodiment, said periodic processing includes estimating incoming rates of each of said plurality of classes; and wherein said processing each particular packet includes dropping or admitting the particular packet based on said estimated incoming rate of the particular class.

One embodiment for partitioning bandwidth processes each particular packet of a plurality of packets in order to determine whether to admit said particular packet to a queue or drop said particular packet based on a particular probability of a plurality of probabilities corresponding to a particular class of a plurality of classes of packets, to update a measurement of arrived traffic corresponding to the particular class of packets, and to cause said particular packet to be correspondingly admitted to the queue or dropped in response to said determination of whether to admit or drop said particular packet; wherein said particular packet corresponds to the particular class of packets, each of the plurality of packets corresponds to a class of the plurality of classes of packets, and each of the plurality of classes is associated with an arrival rate of a plurality of arrival rates and a fair share of a plurality of fair shares; and periodically updates, after a predetermined duration exceeding the processing time of multiple said particular packets, said arrival rates based on said measurements of arrived traffic, said fair shares based on the length of the queue, and said probabilities based on said arrival rates and said fair shares.

In one embodiment, said periodically updating includes steps for identifying a state being active or inactive; and wherein said processing each particular packet includes admitting the particular packet regardless of the particular probability in response to state being inactive. In one embodiment, said identifying the state being active or inactive includes steps for identifying that a length of the queue is less than or equal to a predetermined queue length threshold value. In one embodiment, said identifying the state being active or inactive includes steps for identifying that a cumulative arrival rate of the plurality of packets is less than or equal to a predetermined cumulative arrival rate threshold value. In one embodiment, said processing each particular packet includes steps for identifying whether or not said particular arrival rate equals or exceeds a burst threshold, and in response to said identifying said particular arrival rate equals or exceeds the burst threshold, causing the particular packet to be dropped. In one embodiment, said periodically updating includes steps for estimating incoming rates of each of said plurality of classes; and wherein said processing each particular packet includes steps for dropping or admitting the particular packet based on said estimated incoming rate of the particular class.

One embodiment includes one or more computer-readable media tangibly embodying computer executable instructions for performing steps for partitioning bandwidth. In one embodiment, these steps comprise: processing each particular packet of a plurality of packets in order to determine whether to admit said particular packet to a queue or drop said particular packet based on a particular probability of a plurality of probabilities corresponding to a particular class of a plurality of classes of packets, to update a measurement of arrived traffic corresponding to the particular class of packets, and to cause said particular packet to be correspondingly admitted to the queue or dropped in response to said determination of whether to admit or drop said particular packet; wherein said particular packet corresponds to the particular class of packets, each of the plurality of packets corresponds to a class of the plurality of classes of packets, and each of the plurality of classes is associated with an arrival rate of a plurality of arrival rates and a fair share of a plurality of fair shares; and periodically updating, after a predetermined duration exceeding the processing time of multiple said particular packets, said arrival rates based on said measurements of arrived traffic, said fair shares based on the length of the queue, and said probabilities based on said arrival rates and said fair shares.

In one embodiment, said steps for periodic processing include steps for identifying a state being active or inactive; and wherein said steps for processing each particular packet include steps for admitting the particular packet regardless of the particular probability in response to state being inactive. In one embodiment, said steps for identifying a state being active or inactive includes steps for identifying that a length of the queue is less than or equal to a predetermined queue length threshold value. In one embodiment, said steps for identifying a state being active or inactive includes steps for identifying that a cumulative arrival rate of the plurality of packets is less than or equal to a predetermined cumulative arrival rate threshold value. In one embodiment, said steps for periodic processing include steps for updating said plurality of probabilities corresponding to the plurality of arrival rates. In one embodiment, said steps for processing each particular packet includes steps for identifying whether or not said particular arrival rate equals or exceeds a burst threshold, and in response to said identifying said particular arrival rate equals or exceeds the burst threshold, causing the particular packet to be dropped. In one embodiment, said steps for periodic processing include steps for estimating incoming rates of each of said plurality of classes; and wherein said steps for processing each particular packet includes steps for dropping or admitting the particular packet based on said estimated incoming rate of the particular class.

Figure 1:
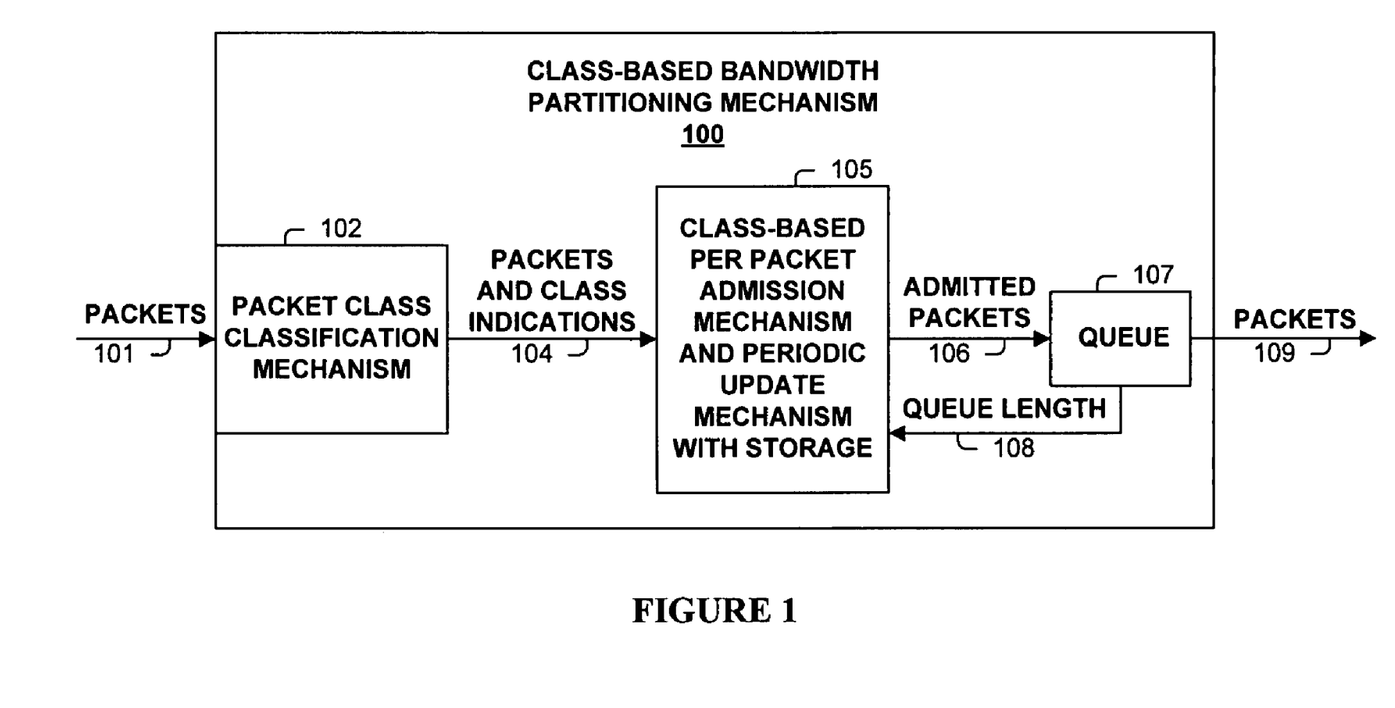
FIG. 1 is a block diagram of a class-based bandwidth partitioning mechanism used in one embodiment.

FIG. 1 is a block diagram of a class-based bandwidth partitioning mechanism 100 used in one embodiment. A packet of packets 101 is received, and is classified using classification mechanism 102 (e.g., an associative memory or other identification mechanism) based on one or more values (e.g., quality control parameters, source address, destination address, etc.) extracted from the received packet to identify a corresponding class associated with the received packet. The received packet (or an indication thereof) and an identifier corresponding to the identified class of a class (104) are used by class-based per packet admission mechanism (e.g., data path processing mechanism) and periodic update mechanism (e.g., control path processing mechanism) with storage 105 to determine whether to admit (106) the packet to queue 107 or to drop received packet as described herein. Note, the length 108 (e.g., occupancy) of queue 107 is used in periodically updating one or more parameters for use in identifying whether to admit or drop a packet. Packets 109 are then retrieved from queue 107 for further processing and/or forwarding as required by the system.

Figure 2:
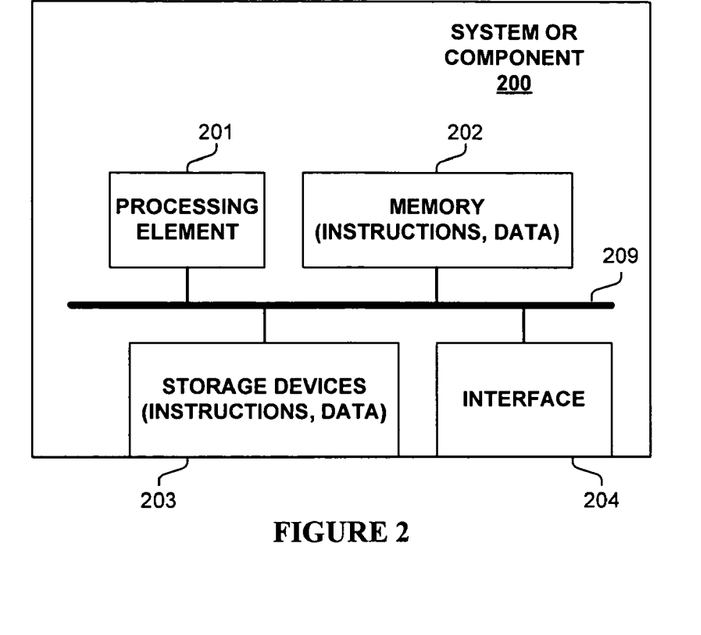
FIG. 2 is a block diagram of a system or component for performing class-based bandwidth partitioning used in one embodiment.

FIG. 2 is a block diagram of a system or component 200 used in one embodiment for maintaining performing class-based bandwidth partitioning. In one embodiment, system or component 200 performs one or more processes corresponding to one of the flow diagrams or pseudo code illustrated or otherwise described herein.

In one embodiment, system or component 200 includes a processing element 201, memory 202, storage devices 203, and an interface 204 for sending and receiving packets and/or communicating with external devices (e.g. one or more memories and/or classification/lookup mechanisms), which are typically communicatively coupled via one or more communications mechanisms 209, with the communications paths typically tailored to meet the needs of the application.

Various embodiments of component 200 may include more or less elements. The operation of component 200 is typically controlled by processing element 201 using memory 202 and storage devices 203 to perform one or more tasks or processes. Memory 202 is one type of computer-readable medium, and typically comprises random access memory (RAM), read only memory (ROM), flash memory, integrated circuits, and/or other memory components. Memory 202 typically stores computer-executable instructions to be executed by processing element 201 and/or data which is manipulated by processing element 201 for implementing functionality in accordance with an embodiment. Storage devices 203 are another type of computer-readable medium, and typically comprise solid state storage media, disk drives, diskettes, networked services, tape drives, and other storage devices. Storage devices 203 typically store computer-executable instructions to be executed by processing element 201 and/or data which is manipulated by processing element 201 for implementing functionality in accordance with an embodiment.

Figure 3A:
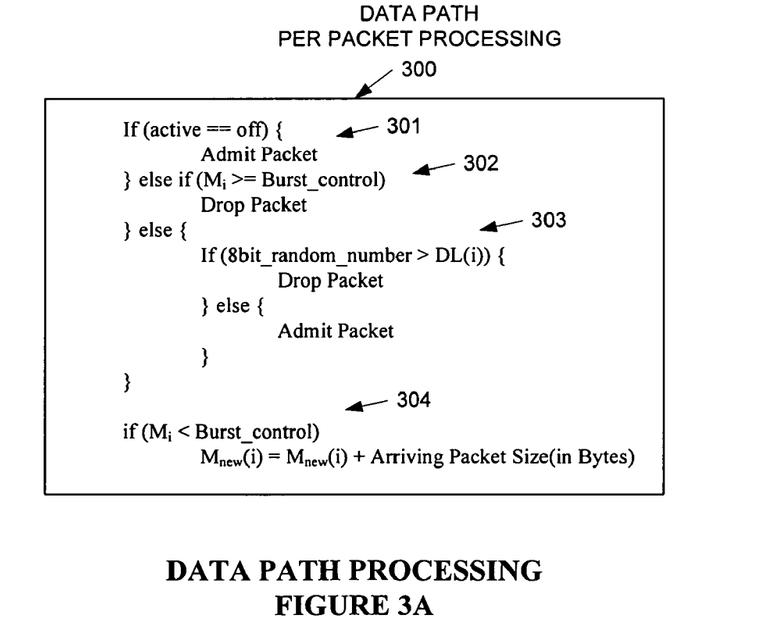
FIG. 3A is a diagram illustrating data path processing performed in one embodiment.

FIG. 3A is a diagram illustrating data path processing 300 for a packet as performed in one embodiment. If the current state, as determined by the control path processing (FIG. 3B), is not active (301), the packet is automatically admitted. Otherwise, if the arrival rate for the class corresponding to the packet is greater than or equal to a predetermined burst threshold value (302), then the packet is dropped. Otherwise, a decision (303) is made of whether to drop or admit the packet based on the probability (determined by the control path processing) associated with the class corresponding to the packet, and the packet is corresponding caused to be admitted or dropped. If the packet was not dropped based on the burst threshold value, then the measurement of arrived traffic for the corresponding packet class is updated.

Figure 3B:
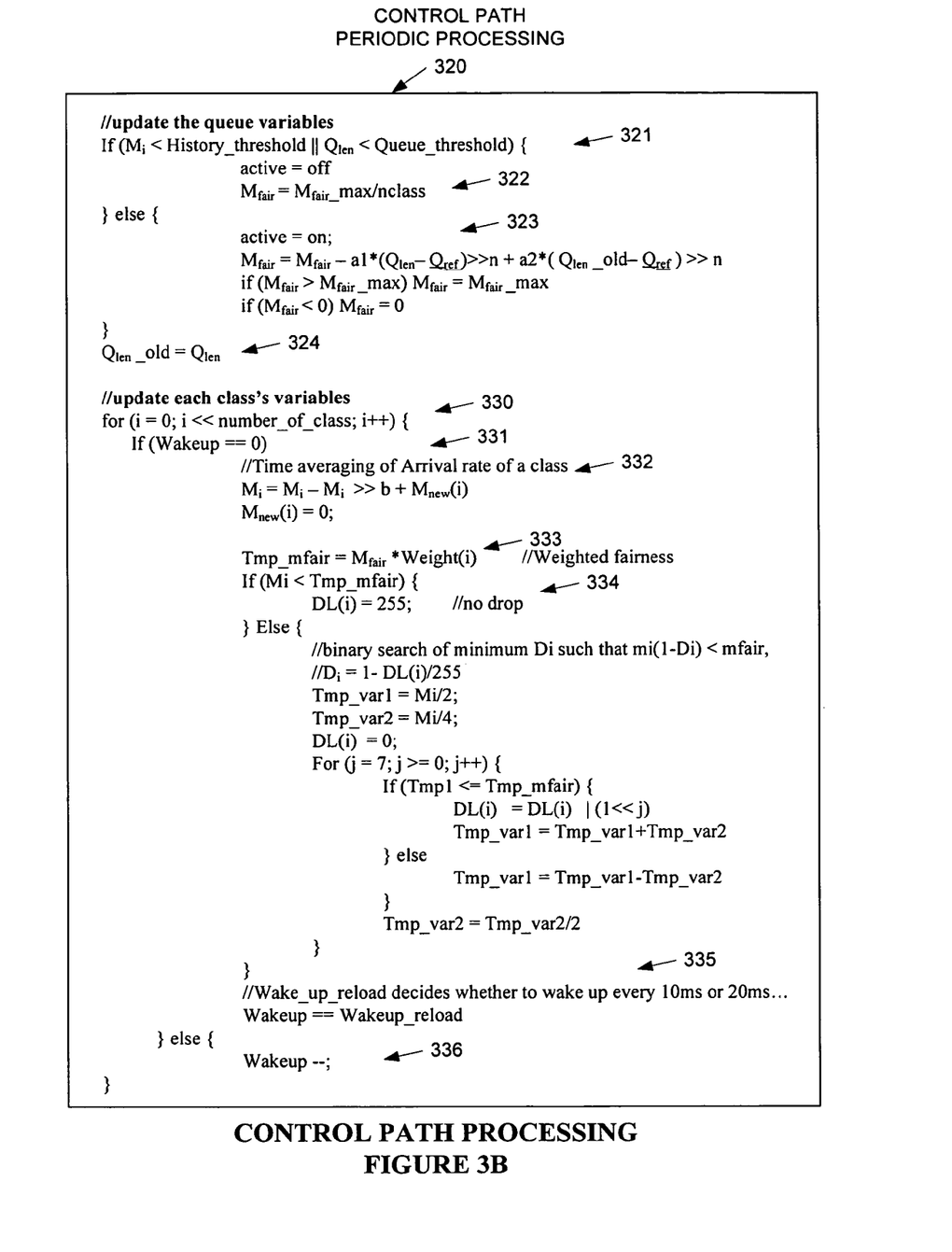
FIG. 3B is a diagram illustrating control path processing performed in one embodiment.

FIG. 3B is a diagram illustrating control path processing 320 performed in one embodiment. Typically, this processing is performed after a predetermined duration (e.g., after a set time or after processing of a predetermined number of packets greater than one). In one embodiment, this processing is performed every ten or twenty milliseconds.

There are two situations that need to automatically ensure that the state (e.g., active or inactive) of the class-based bandwidth partitioning mechanism is inactive: when the queue length falls below a predetermined threshold (e.g., to ensure that there is enough data in the queue to maximize link utilization), and when the total packet arrival rate is below another predetermined threshold to ensure that the class-based bandwidth partitioning mechanism has enough data to appropriately partition the bandwidth. Thus, a determination (321) is made of whether or not at least one of these two conditions exists, and if so, then (322) the state is set to inactive and current fair share value is initialized. Otherwise, the state is set to active, and the current fair share value is calculated based on an equation used by the prior art mechanism of AFD, but typically in a distinguishable manner (e.g., the actual calculations performed, imposing maximum and minimum values, etc.). Approximate Fair Dropping (AFD), which is described in Pan et al., "Approximate Fairness through Differential Dropping," ACM SIGCOMM Computer Communication Review, Vol. 33, Issue 2 (April 2003), pp. 23-39, and is hereby incorporated by reference in its entirety. The current length of the queue is recorded (324) for use in the next periodic control path processing.

Next, processing is performed for each of the classes to determine their corresponding arrival rates ($M_i$) and drop probabilities ($D_i$). One embodiment includes the ability to delay these determinations for an additional time period using a standard wakeup counter (331, 335, 336).

First, the arrival rate ($M_i$) for the corresponding class is determined by aging the old measured arrival rate (shifting its value) and adding in the additional measured arrival traffic $M_{new}(i)$, and then resetting the additional measured arrival rate (which can be incremented during the data path processing, such as that illustrated in FIG. 3A). Next, one embodiment allows the use of a weighted fair share, and performs this adjustment (333). Finally, the drop probability for the current class of packets is determined (334). This can be performed using a division operation, or as shown, using an approximation mechanism (e.g., binary search of possible values) to approximate the drop probability to one of a set of predetermined values.

This arrival rate and drop rate determinations are repeated for each of the classes of packets, with the entire control path processing periodically repeated.

Table 1 below provides a listing and description of parameters used in the pseudo code of FIGS. 3A-B.

TABLE 1

PARAMETERS USED IN FIGS. 3A–B

| Parameter | Type | Level | Description |
| --- | --- | --- | --- |
| a1 | Configuration | Queue | Control parameter 1 for $M_{fair}$ calculation |
| a2 | Configuration | Queue | Control parameter 2 for $M_{fair}$ calculation |
| b | Configuration | Queue | Control parameter for calculating average arrival rate, it determines the averaging window of the bandwidth partitioning mechanism |
| Burst_control | Configuration | Queue | Threshold for the maximum bytes allowed for each class in an averaging window |
| History_threshold | Configuration | Queue | If the total arrival (in bytes) to a queue in an averaging window is less than this threshold, bandwidth partitioning is turned off |
| MCSQ_active | State | Queue | Indicate whether bandwidth partitioning is on/off |
| $M_{fair}$ | State | Queue | Current fair share value |
| $M_{fair}$_max | Configuration | Queue | The maximum allowed $M_{fair}$ value |

TABLE 1-continued

PARAMETERS USED IN FIGS. 3A–B

| Parameter | Type | Level | Description |
| --- | --- | --- | --- |
| n | Configuration | Queue | Control parameter 3, for $M_{fair}$ calculation, the power of two |
| nclass | Configuration | Queue | The number of virtual queues/classes per physical queue |
| $Q_{len}$ | State | Queue | Last recorded queue length, updated every time interval |
| $Q_{ref}$ | Configuration | Queue | Reference queue length, the bandwidth partitioning mechanism stabilizes the queue length to this value |
| Queue_threshold | Configuration | Queue | If the queue length is less than this threshold, bandwidth partitioning is turned off |
| $M_{new}(i)$ | State | Class | Current measurement of arrival rate (in bytes) in the 10 ms window |
| $M_i$ | State | Class | Average arrival rate in bytes for class I, (i = 1, 2, 3, . . .) |
| Wakeup(i) | Configuration | Class | Current count for the number of 10 ms interval occurred since last update, (i = 1, 2, 3, . . .) |
| Wakeup_Reload(i) | Configuration | Class | Control for background process wake up period, (i = 1, 2, 3, . . .) |
| Weight(i) | Configuration | Class | Weight for class i (i = 1, 2, 3, . . .) |

Figure 4:
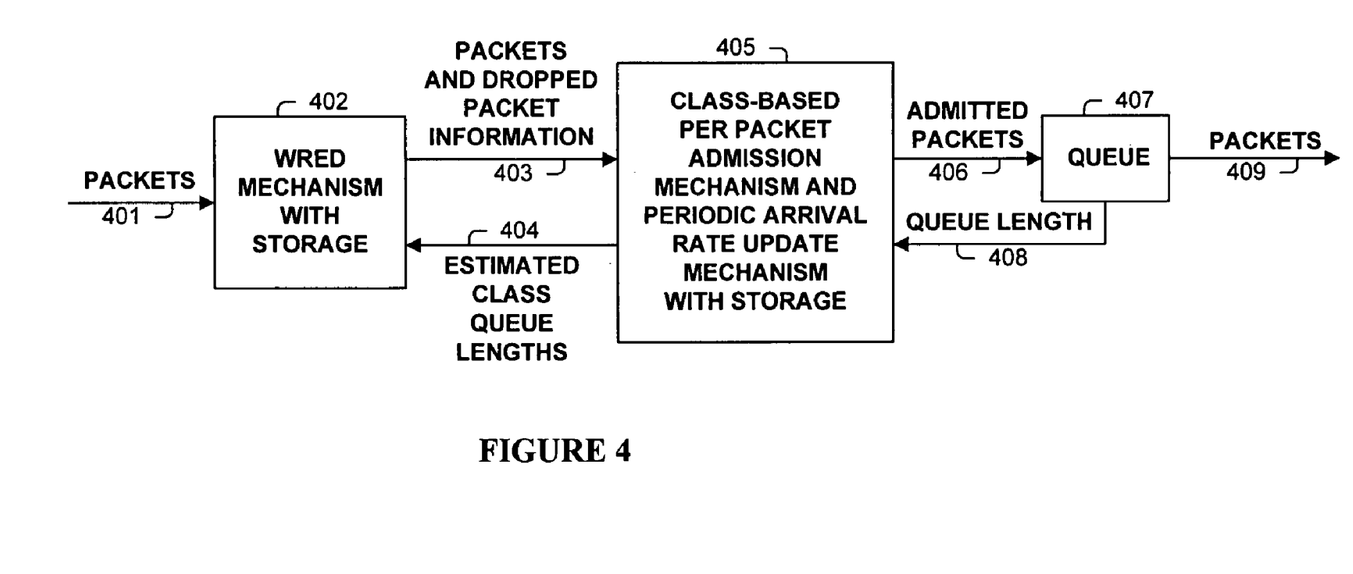
FIG. 4 is a block diagram of a class-based bandwidth partitioning mechanism used in conjunction with a WRED processing mechanism in one embodiment.

FIG. 4 is a block diagram of a class-based bandwidth partitioning mechanism 408 used in conjunction with a WRED processing mechanism with storage 402 in one embodiment. WRED is described in Lin et al., U.S. Pat. No. 6,463,068, issued Oct. 8, 2002, which is hereby incorporated by reference in its entirety.

Note, a typical goal of class-based bandwidth partitioning used in one embodiment is to ensure fairness, so it is typically not desirable to allow any WRED drop to cause unfairness among the classes of packets. Therefore, in one embodiment, the aggregated drops using both WRED and class-based bandwidth partitioning are the same as would occur if only class-based bandwidth partitioning was used.

Packets 401 are received by WRED mechanism 402, with the allowed packets and dropped packet information 403 forwarded to class-based per packet admission mechanism (e.g., data path processing mechanism) and periodic update mechanism (e.g., control path processing mechanism) with storage 405 to determine whether to admit (406) the packet to queue 407 or to drop received packet as described herein. Note, the length 408 (e.g., occupancy) of queue 407 is used in periodically updating one or more parameters for use in identifying whether to admit or drop a packet. Packets 409 are then retrieved from queue 407 for further processing and/or forwarding as required by the system. Also, note, WRED is responsive to the incoming rates of classes. However, queue length 408 represents an approximation of the outgoing rate of the classes. Therefore, class-based per packet admission mechanism and periodic update mechanism with storage 405 provides estimated class queue lengths 404 to WRED mechanism 402. One mechanism for determining these estimated class queue lengths 404 will be discussed in relation to FIGS. 5A-B.

Figure 5A:
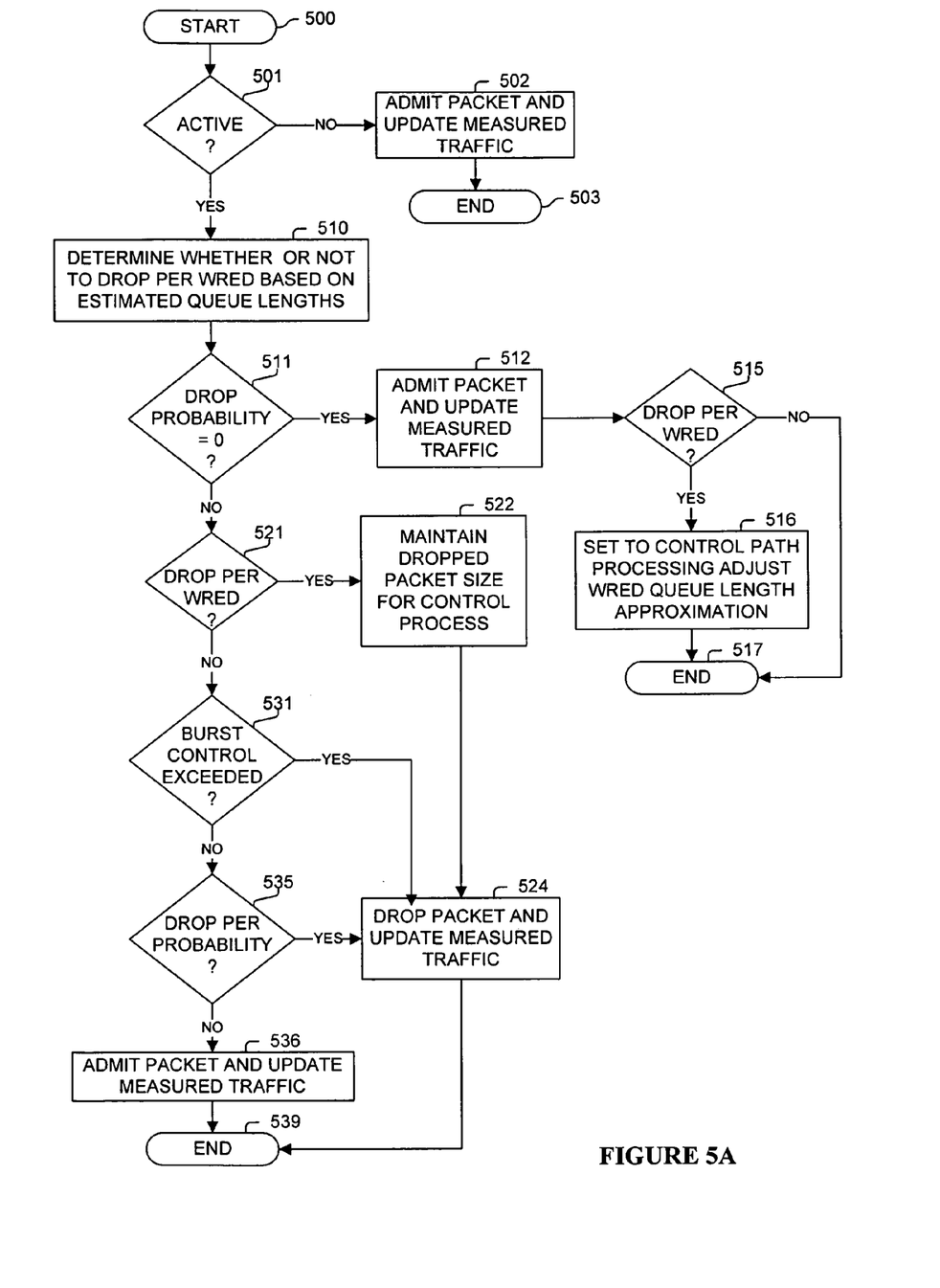
FIG. 5A is a diagram illustrating data path processing performed in one embodiment performing WRED and class-based bandwidth partitioning.
Figure 5B:
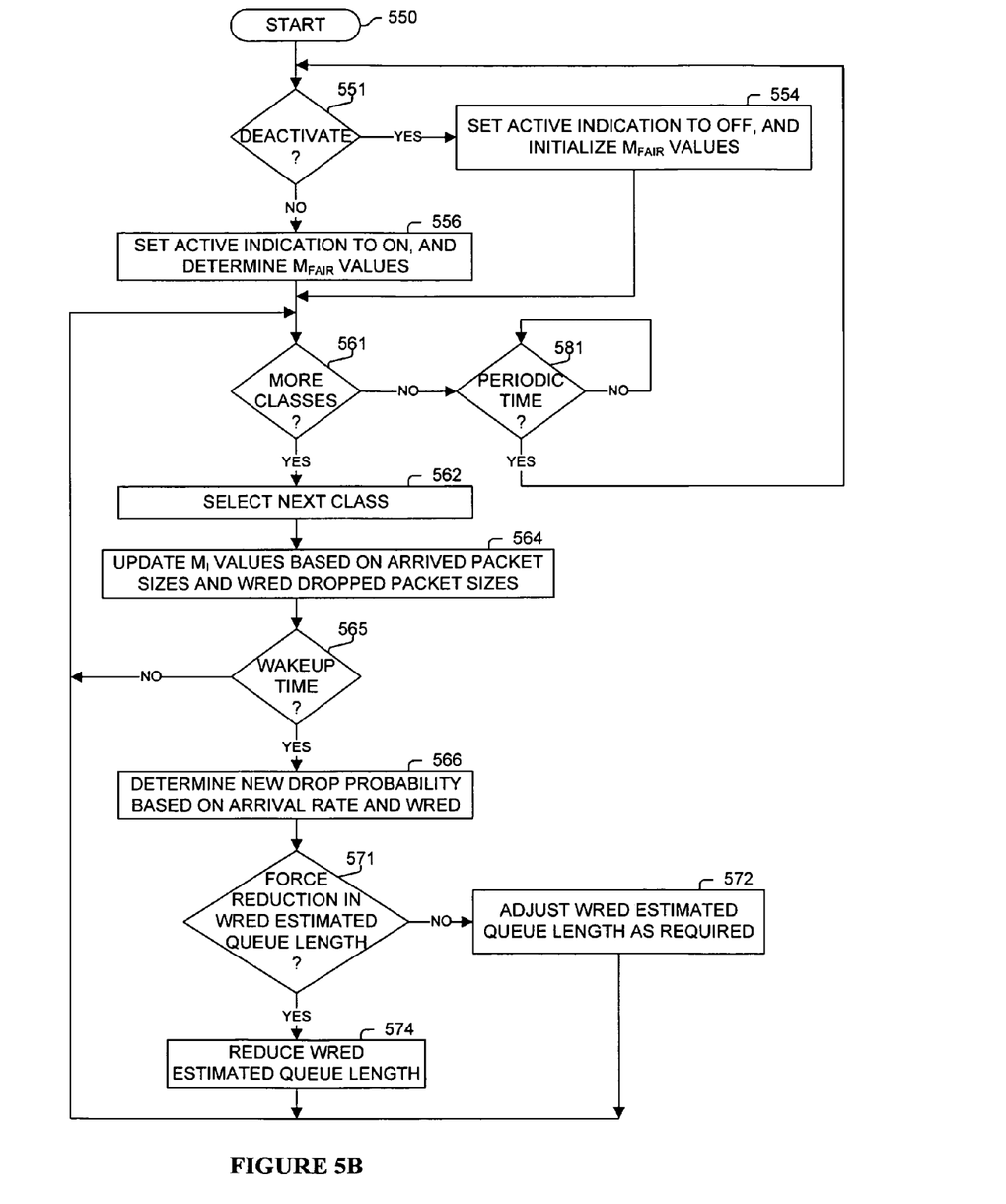
FIG. 5B is a diagram illustrating control path processing performed in one embodiment performing WRED and class-based bandwidth partitioning.

Rather than perform independent WRED and class-based bandwidth partitioning processing such as that illustrated in FIG. 4, it is possible to combine these operations, such as that illustrated in FIGS. 5A-B, which show combined class-based bandwidth partitioning and WRED data path and control path processing performed in one embodiment. Note, this processing parallels that shown in FIGS. 3A-B, with WRED operations added.

Turning first to FIG. 5A, processing begins with process block 500, and proceeds to process block 501. As determined in process block 501, if the current state is not active (e.g., it is inactive such as a result of one of the scenarios discussed in relation to FIG. 3A), then in process block 502, the packet is admitted and the measured amount of arrived traffic is updated, and processing of the received packet is complete as indicated by process block 503. Otherwise, in process block 510, a determination is made on whether or not to drop the packet per WRED based on the estimated incoming queue lengths. As determined in process block 511, if the drop probability of the class of packets corresponding to the received packet is zero, then in process block 512, the packet is admitted and the measured amount of arrived traffic is updated. If WRED would have dropped the packet as determined in process block 515 (i.e., per the determination of process block 510), then in process block 516 the control path is alerted via some signaling mechanism (e.g., setting a flag, interprocess communication, etc.) to adjust the WRED queue length approximation, and processing of the received packet is complete as indicated by process block 517.

Otherwise, if WRED would have dropped the packet as determined in process block 521 (i.e., per the determination of process block 510), then in process block 522, the dropped packet size is maintained (so can be used by the control path processing), the packet is dropped and the measured amount of arrived traffic is updated as indicated by process block 524, and processing of the received packet is complete as indicated by process block 539.

Otherwise, as determined in process block 531, if the burst control threshold value has been exceeded by the class of packets associated with the received packet, then the packet is dropped and the measured amount of arrived traffic is updated as indicated by process block 524, and processing of the received packet is complete as indicated by process block 539. Otherwise, as determined in process block 535, if the packet should be dropped based on the probability associated with the class of packets corresponding to the received packet, then the packet is dropped and the measured amount of arrived traffic is updated as indicated by process block 524, and processing of the received packet is complete as indicated by process block 539. Otherwise, in process block 512, the packet is admitted and the measured amount of arrived traffic is updated, a and processing of the received packet is complete as indicated by process block 539.

FIG. 5B is a diagram illustrating control path processing performed in one embodiment performing WRED and class-based bandwidth partitioning. Processing begins with process block 550. As determined in process block 551, if the current state should be set to inactive (i.e., for a reason discussed in relation to reference 321 of FIG. 3A), then in process block 554, the state is set to inactive and current fair share value is initialized. Otherwise, in process block 556, the state is set to active, the current fair share value is calculated in the same manner as the prior art mechanism of AFD, with some imposed maximum and minimum values.

As determined in process block 561, while there are more classes of packets to process, process blocks 562-574 are repeatedly performed. In process block 562, a next class of packet is selected. In process block 564, the arrival rate for the current class of packets is updated based on the measured arrived traffic and WRED dropped packet sizes (e.g., from process block 522 of FIG. 5A). As determined in process block 565, if it is not the current wakeup time, processing returns to process block 561. Otherwise, in process block 566, the drop probability is determined based on the new arrival rate and WRED drops. As determined in process block 571, if the estimated queue length used by WRED should be decreased (e.g., from process block 516 of FIG. 5A or the drop probability is less than three percent), then in process block 574, the WRED estimated queue length is decreased. Otherwise, the WRED estimated queue length is adjusted (e.g., increased or decreased) typically by the difference between the drop probability and some small percentage (e.g., three, six, ten). Note, in one embodiment, finer adjustments are made, such as, but not limited to, if the drop probability is less than $1/64$, then the queue length estimation is always decreased, if it is less than $1/16$, then it is adjusted to around 1.5%, if it is less than $1/8$, it is adjust to around 3%, if it is higher than $1/8$, it is adjusted to around 6%. Processing returns to process block 561.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. An apparatus, comprising:
a same single queue;
means for processing each particular packet of a plurality of packets in order to determine whether or not to admit said particular packet to the same single queue based on a particular probability of a plurality of probabilities corresponding to a particular class of a plurality of classes of packets, to update a measurement of arrived traffic corresponding to the particular class of packets, to admit said particular packet to the same single queue in response to said determination to admit said particular packet to the same single queue, and to drop said particular packet in response to said determination of not to admit said particular packet to the same single queue; wherein said particular packet corresponds to the particular class of packets, each of the plurality of packets corresponds to a class of the plurality of classes of packets, the plurality of packets includes one or more packets from each of the plurality of classes of packets, and each of the plurality of classes is associated with an arrival rate of a plurality of arrival rates and a fair share of a plurality of fair shares; and
means for periodically updating, in response to a predetermined duration exceeding the processing time of multiple packets by said means for processing each particular packet, said arrival rates based on said measurements of arrived traffic, said fair shares based on the length of the same single queue, and said probabilities based on said arrival rates and said fair shares.

2. The apparatus of claim 1, wherein said means for processing each particular packet includes means for identifying whether or not a particular arrival rate of the plurality of arrival rates corresponding to the particular class of packets equals or exceeds a burst threshold, and for dropping said particular packet in response to said identifying said particular arrival rate equals or exceeds the burst threshold.

3. The apparatus of claim 1, wherein said means for processing of said particular packet includes means for comparing a particular arrival rate of the plurality of arrival rates corresponding to the particular class of packets and a burst rate threshold in order to identify whether or not said particular packet should be dropped based on the burst rate threshold, and in response to said identifying that said particular packet should be dropped based on the burst rate threshold, dropping the particular packet.

4. The apparatus of claim 1, wherein said means for periodically updating the plurality of arrival rates updates includes means for estimating incoming rates of each of said plurality of classes; and wherein said means for processing each particular packet includes means for dropping and admitting to the same single queue the particular packet based on said estimated incoming rate of the particular class.

5. The apparatus of claim 1, wherein said means for periodically updating the plurality of arrival rates updates includes means for identifying an inactive state; and wherein said means for processing each particular packet includes means for admitting to the same single queue the particular packet regardless of the particular probability in response to the inactive state.

6. The apparatus of claim 5, wherein said means for identifying the inactive state includes means for identifying that a length of the same single queue is less than or equal to a predetermined queue length threshold value.

7. The apparatus of claim 5, wherein said means for identifying the inactive state includes means for identifying that a cumulative arrival rate of the plurality of packets is less than or equal to a predetermined cumulative arrival rate threshold value.

8. An apparatus comprising:
a same single queue;
a data path processing mechanism configured to process each particular packet of a plurality of packets in order to determine whether or not to admit said particular packet to the same single queue based on a particular probability determined from a particular arrival rate of a plurality of arrival rates and a fair share of a plurality of fair shares identified based on a length of the same single queue, to update a measurement of arrived traffic corresponding to a particular class of a plurality of classes of packets, to admit said particular packet to the same single queue in response to said determination to admit said particular packet to the same single queue, and to drop said particular packet in response to said determination of not to admit said particular packet to the same single queue, the plurality of packets includes one or more packets from each of the plurality of classes of packets; wherein said particular packet and said particular arrival rate each correspond to the particular class; and wherein each of the plurality of classes is associated with an arrival rate of the plurality of arrival rates and a fair share of the plurality of fair shares, each of the plurality of packets corresponds to a class of the plurality of classes of packets, and each of the plurality of arrival rates has a corresponding said probability; and
a control path processing mechanism configured to periodically update, in response to a predetermined duration exceeding the processing time of multiple packets by the data path processing mechanism, the plurality of arrival rates for each of the plurality of classes based on said measurements of arrived traffic, and the plurality of fair shares based on a current length of the same single queue.

9. The apparatus of claim 8, wherein the control path processing mechanism is configured to periodically update said plurality of probabilities based on the plurality of fair shares and the plurality of arrival rates.

10. The apparatus of claim 8, wherein the data path processing mechanism is configured to identify whether or not said particular arrival rate equals or exceeds a burst threshold, and in response to said identifying said particular arrival rate equals or exceeds the burst threshold, the data path processing mechanism causing the particular packet to be dropped.

11. The apparatus of claim 8, wherein the control path processing mechanism includes is configured to estimate incoming rates of each of said plurality of classes; and wherein the data path processing mechanism is configured to drop and admit the particular packet to the same single queue based on said estimated incoming rate of the particular class.

12. The apparatus of claim 8, wherein the control path processing mechanism is configured to identify an inactive or an active state; and wherein the data path processing mechanism is configured admit the particular packet to the same single queue regardless of the particular probability in response to the inactive state.

13. The apparatus of claim 12, wherein the control path processing mechanism identifies the inactive state in response to a length of the same single queue being less than or equal to a predetermined queue length threshold value.

14. The apparatus of claim 12, wherein the control path processing mechanism identifies the inactive state in response to a cumulative arrival rate of the plurality of packets being less than or equal to a predetermined cumulative arrival rate threshold value.

15. A method for partitioning bandwidth performed by a class-based bandwidth partitioning mechanism using a same single queue, with the method comprising:
processing, by the class-based bandwidth partitioning mechanism, each particular packet of a plurality of packets in order to determine whether or not to admit said particular packet to the same single queue based on a particular probability determined from a particular arrival rate of a plurality of arrival rates and a fair share of a plurality of fair shares identified based on a length of the same single queue, to update a measurement of arrived traffic corresponding to a particular class of a plurality of classes of packets, to admit said particular packet to the same single queue in response to said determination to admit said particular packet to the same single queue; wherein said particular packet and said particular arrival rate each correspond to the particular class; wherein each of the plurality of classes is associated with an arrival rate of the plurality of arrival rates and a fair share of the plurality of fair shares, each of the plurality of packets corresponds to a class of the plurality of classes of packets, and each of the plurality of arrival rates has a corresponding said probability, and the plurality of packets includes one or more packets from each of the plurality of classes of packets; and
periodic processing, by the class-based bandwidth partitioning mechanism, after a predetermined duration, said periodic processing including updating the plurality of arrival rates for each of the plurality of classes based on said measurements of arrived traffic, and the plurality of fair shares based on a current length of the same single queue.

16. The method of claim 15, wherein said periodic processing updates said probabilities based on the plurality of fair shares and the plurality of arrival rates.

17. The method of claim 15, wherein said periodic processing includes identifying a state being active or inactive; and wherein said processing each particular packet includes admitting the particular packet to the same single queue regardless of the particular probability in response to state being inactive.

18. The method of claim 17, wherein said identifying the state being active or inactive includes identifying that a length of the same single queue is less than or equal to a predetermined queue length threshold value.

19. The method of claim 17, wherein said identifying the state being active or inactive includes steps for identifying that a cumulative arrival rate of the plurality of packets is less than or equal to a predetermined cumulative arrival rate threshold value.

20. The method of claim 15, wherein said processing each particular packet includes identifying whether or not said particular arrival rate equals or exceeds a burst threshold, and in response to said identifying said particular arrival rate equals or exceeds the burst threshold, causing the particular packet to be dropped.

21. The method of claim 15, wherein said periodic processing includes estimating incoming rates of each of said plurality of classes; and wherein said processing each particular packet includes dropping or admitting to the same single queue the particular packet based on said estimated incoming rate of the particular class.

22. A method for partitioning bandwidth performed by a class-based bandwidth partitioning mechanism using a same single queue, the method comprising:
processing, by the class-based bandwidth partitioning mechanism, each particular packet of a plurality of packets in order to determine whether or not to admit said particular packet to the same single queue based on a particular probability of a plurality of probabilities corresponding to a particular class of a plurality of classes of packets, to update a measurement of arrived traffic corresponding to the particular class of packets, and to cause said particular packet to be correspondingly admitted to the same single queue or dropped in response to said determination of whether or not to admit said particular packet to the same single queue; wherein said particular packet corresponds to the particular class of packets, each of the plurality of packets corresponds to a class of the plurality of classes of packets, the plurality of packets includes one or more packets from each of the plurality of classes of packets, and each of the plurality of classes is associated with an arrival rate of a plurality of arrival rates and a fair share of a plurality of fair shares; and
periodically updating, by the class-based bandwidth partitioning mechanism in response to a predetermined duration exceeding the processing time of multiple said particular packets, said arrival rates based on said measurements of arrived traffic, said fair shares based on the length of the same single queue, and said probabilities based on said arrival rates and said fair shares.

23. The method of claim 22, wherein said periodically updating includes steps for identifying a state being active or inactive; and wherein said processing each particular packet includes admitting the particular packet to the same single queue regardless of the particular probability in response to state being inactive.

24. The method of claim 23, wherein said identifying the state being active or inactive includes steps for identifying that a length of the same single queue is less than or equal to a predetermined queue length threshold value.

25. The method of claim 23, wherein said identifying the state being active or inactive includes steps for identifying that a cumulative arrival rate of the plurality of packets is less than or equal to a predetermined cumulative arrival rate threshold value.

26. The method of claim 22, wherein said processing each particular packet includes steps for identifying whether or not said particular arrival rate equals or exceeds a burst threshold, and in response to said identifying said particular arrival rate equals or exceeds the burst threshold, causing the particular packet to be dropped.

27. The method of claim 22, wherein said periodically updating includes steps for estimating incoming rates of each of said plurality of classes; and wherein said processing each particular packet includes steps for dropping or admitting to the same single queue the particular packet based on said estimated incoming rate of the particular class.

28. One or more tangible computer-readable media tangibly embodying computer-executable instructions for performing steps for partitioning bandwidth using a same single queue, said steps comprising:

processing each particular packet of a plurality of packets in order to determine whether or not to admit said particular packet to the same single queue based on a particular probability of a plurality of probabilities corresponding to a particular class of a plurality of classes of packets, to update a measurement of arrived traffic corresponding to the particular class of packets, and to cause said particular packet to be correspondingly admitted to the same single queue or dropped in response to said determination of whether or not to admit said particular packet to the same single queue; wherein said particular packet corresponds to the particular class of packets, each of the plurality of packets corresponds to a class of the plurality of classes of packets, the plurality of packets includes one or more packets from each of the plurality of classes of packets, and each of the plurality of classes is associated with an arrival rate of a plurality of arrival rates and a fair share of a plurality of fair shares; and periodically updating, in response to a predetermined duration exceeding the processing time of multiple said particular packets, said arrival rates based on said measurements of arrived traffic, said fair shares based on the length of the same single queue, and said probabilities based on said arrival rates and said fair shares.

29. The computer-readable media of claim 28, wherein said steps for periodic processing include steps for identifying a state being active or inactive; and wherein said steps for processing each particular packet include steps for admitting the particular packet to the same single queue regardless of the particular probability in response to state being inactive.

30. The computer-readable media of claim 29, wherein said steps for identifying a state being active or inactive includes steps for identifying that a length of the same single queue is less than or equal to a predetermined queue length threshold value.

31. The computer-readable media of claim 29, wherein said steps for identifying a state being active or inactive includes steps for identifying that a cumulative arrival rate of the plurality of packets is less than or equal to a predetermined cumulative arrival rate threshold value.

32. The computer-readable media of claim 28, wherein said steps for periodic processing include steps for updating said plurality of probabilities corresponding to the plurality of arrival rates.

33. The computer-readable media of claim 28, wherein said steps for processing each particular packet includes steps for identifying whether or not said particular arrival rate equals or exceeds a burst threshold, and in response to said identifying said particular arrival rate equals or exceeds the burst threshold, causing the particular packet to be dropped.

34. The computer-readable media of claim 28, wherein said steps for periodic processing include steps for estimating incoming rates of each of said plurality of classes; and wherein said steps for processing each particular packet includes steps for dropping or admitting the particular packet to the same single queue based on said estimated incoming rate of the particular class.

* * * * *